Patented July 20, 1926.

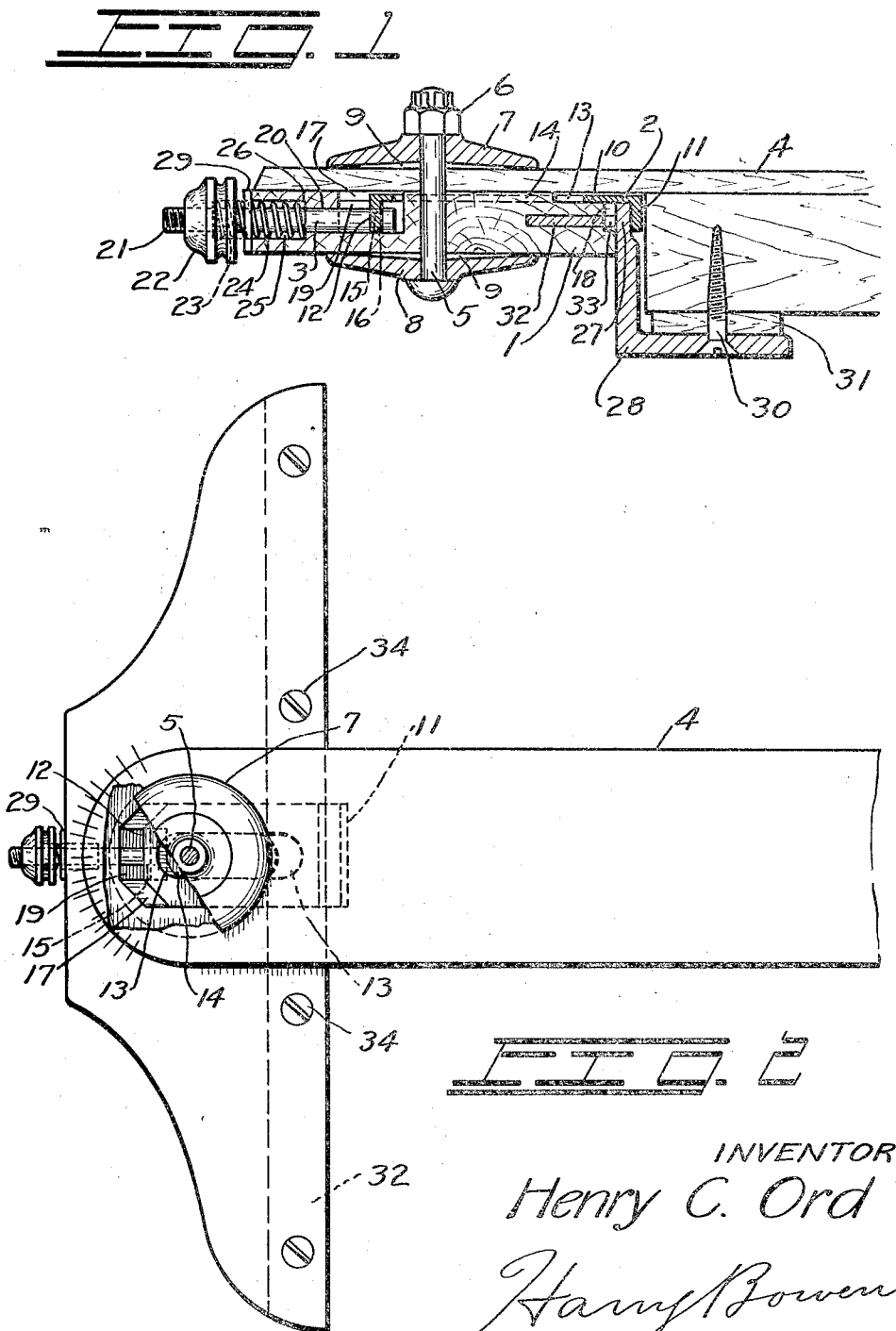

1,593,097

UNITED STATES PATENT OFFICE.

HENRY C. ORD, OF TACOMA, WASHINGTON.

T SQUARE.

Application filed May 31, 1924. Serial No. 717,040.

The invention is the provision of a spring clip of simple and economical construction in combination with a swivel head T square for holding the T square against the edge of a drawing board.

With these ends in view the invention embodies a T square having a clip slidably mounted in openings in its head, a spring pin for holding the clip, a nut for adjusting the tension on the spring, and a track over which the clip may operate, or to which the head may be rigidly clamped.

Other features and advantages of the invention will appear from the following description taken in connection with the drawings, wherein:—

Figure 1 is a cross section through the head of the T square.

Figure 2 is a plan view with parts broken away.

In the drawings I have shown my T square as it would be constructed wherein numeral 1 indicates the head, numeral 2 the spring clip, and numeral 3 the pin for holding the clip.

The head 1 may be of any suitable shape, size, or design or of any suitable material and may have a tongue 4, of any suitable size or design, pivotally attached to it by a bolt 5 with an adjusting nut 6 by which the tongue may be firmly clamped to the head through washers 7 and 8. The washers may have beveled surfaces 9 at their inner sides so that their outer edges will grip the T square firmly. The end of the tongue is curved on a radius from the center of the bolt 5 and graduated to correspond with similar graduations on the head.

The clip 2 is shaped as shown with a plate or bar 10 forming the top and flanges 11 and 12 extending downward at the ends. The top is provided with an opening 13 which fits over a projection 14 in the center of the head to form a positive guide for the clip 2, and the projection 14 also provides a bearing for the tongue 4. The end 12 of the clip is provided with a slotted opening 15 as indicated by the dotted lines and this opening is placed over a recess 16 in the pin 3 so that the clip will move with the pin. The clip is mounted in a slot 17 in the top of the head and at one end of the slot is an opening 18 which extends downward so that the end 11 will fit into it and at the other end of the slot is an opening 19 into which the end 12 of the clip and also the end of the pin project.

The pin 3 is slidably mounted in a hole 20 in the head and provided with threads 21 at its outer end upon which an adjusting nut 22 is screwed. The adjusting nut is provided with a recess 23 into which a spring 24 will project and the opposite end of the spring extends into another recess 25 around the pin in the head and bears against a shoulder 26 as shown in Figure 1. It will be seen that the spring will normally hold the nut, pin and clip outward so that the opposite end of the clip will be held against the tip 27 of a track angle 28, and the tension on the spring may readily be adjusted by the nut 22. A washer 29 may be placed between the nut 22 and the edge of the T square if desired.

It is understood that any suitable track may be used in place of the angle 28 and the track may be held to the edge of the drawing board or the like by any suitable means or by the screw 30 with a washer 31 under it as shown.

The working edge of the head if made of wood or other soft material may also be provided with a metallic strip 32 having a notch 33 in it, into which the end 11 of the clip may be placed, and the strip 32 may be held to the head by screws 34 as shown or in any other suitable manner.

It is understood that changes may be made in the construction without departing from the spirit of the invention. One of which changes may be in the design of the clip; another may be in the means for mounting the clip in the head; and still another may be in the means for providing the spring tension on the clip. It is also understood that the head or tongue may be made of any other suitable material.

The construction will be readily understood from the foregoing description. To use the device it may be assembled as shown with the clip 2 placed in the opening 13 so that the slot 15 will slide over the recess 16 of the pin 3 and the outer end 11 of the clip placed over the edge 27 of the member 28. It will be seen that this will permit the T square to move along the board and at the same time be slidably or rigidly held against the board so that the tongue 4 will be held in a parallel position at all times. It will also be seen that this special type of spring clip will permit the tongue of the T square to be rotated about the pin 5 so that it may be set at any desired angle in relation to the head. This particular arrangement of the clip therefore makes it possible to provide a swivel head T square with a means for holding it against a straight edge at the edge of a drawing board or the like.

Having thus fully described the invention, that I claim as new and desire to secure by Letters Patents, is:—

1. In a T square having a head and a tongue, a clip in slots in the head, said clip being made of a flat plate with downwardly extending projections at the ends, one of the said projections at the inner end being adapted to engage a straight-edge against which the head of the T square may be placed, and the other of the said projections at the opposite or outer end having a slot in it, and a spring pin having a recess to engage the said slot for holding the said clip inward.

2. A T square having a plate, said plate having an opening in its center and downwardly extending ends and being slidably mounted in slots in the head of the square, one of the said downwardly extending ends being slotted, a pin, a nut at one end of the pin, and said pin having a recess in the other end engaging with a slot in the end of the plate, slidably mounted in the head of the T square, and a spring around the pin and in a recess in the head of the T square for holding the plate in clamping position.

3. In a swivel head T square having a head and tongue, a clip in slots in the said head, said clip being in the form of a plate with downwardly extending ends, the said downwardly extending end at the inner end of the clip being adaptable to engage a straight-edge against which the head may be placed, and the other of the said downwardly extending ends being slotted, a spring pin, said pin having a recess in one end to engage the slot in the clip, and means for holding the said pin to resiliently hold the said clip inward.

4. In a swivel head T square, a plate with an opening in its center and downwardly extending ends, said plate being slidably mounted in slots in the head of the square, one of said downwardly extending ends being slotted, a pin, a nut on one end of the said pin and said pin having a recess in the other end engaging with the slot in the end of the slidably mounted plate in the head of the T square, and a spring around the said pin and in a recess in the head of the T square for holding the plate in clamping position.

5. In a T square having a head and tongue, a bolt for pivotally holding the tongue to the head, washers with concave inner surfaces on the said bolt and engaging the said tongue and head, a metal strip embedded in the straight edge of the said head, a sliding clip mounted in slots in the said head below the said tongue, said sliding clip being adapted to engage a straight edge against which the head of the T square may be placed, a spring, a pin through the said spring behind the said clip, said pin engaging the end of the said clip, a nut at the outer end of the said pin to adjust the tension of the spring, and a washer between the said nut and head.

HENRY C. ORD.